United States Patent
Funamoto

(10) Patent No.: US 7,760,252 B2
(45) Date of Patent: Jul. 20, 2010

(54) SHADING COMPENSATION DEVICE, SHADING COMPENSATION VALUE CALCULATION DEVICE AND IMAGING DEVICE

(75) Inventor: Kenji Funamoto, Asaki (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/453,197

(22) Filed: May 1, 2009

(65) Prior Publication Data

US 2009/0213243 A1 Aug. 27, 2009

Related U.S. Application Data

(62) Division of application No. 11/265,291, filed on Nov. 3, 2005, now abandoned.

(30) Foreign Application Priority Data

Nov. 8, 2004 (JP) .............................. 2004-323820

(51) Int. Cl.
  *H04N 9/77* (2006.01)
  *H04N 5/225* (2006.01)
(52) U.S. Cl. .................................... 348/251
(58) Field of Classification Search ................. 348/251, 348/223.1, 225.1; 382/274
  See application file for complete search history.

(56) References Cited

U.S. PATENT DOCUMENTS

| 7,233,352 B2 | 6/2007 | Matherson et al. |
| 7,386,185 B2 * | 6/2008 | Watanabe et al. ............ 348/251 |
| 7,463,294 B2 | 12/2008 | Tsuda |
| 2002/0033975 A1 | 3/2002 | Yamazaki |
| 2002/0135688 A1 * | 9/2002 | Niikawa ....................... 348/251 |
| 2003/0234879 A1 | 12/2003 | Whitman et al. |
| 2004/0233305 A1 * | 11/2004 | Morishita ..................... 348/245 |
| 2005/0013505 A1 * | 1/2005 | Nishimura et al. ............ 382/274 |
| 2005/0030412 A1 | 2/2005 | Nakayama |
| 2005/0206966 A1 * | 9/2005 | Kakumitsu .................... 358/461 |
| 2006/0061593 A1 | 3/2006 | Miura et al. |
| 2006/0087702 A1 * | 4/2006 | Satoh et al. ................... 358/461 |

FOREIGN PATENT DOCUMENTS

| JP | A05-083622 | 4/1993 |
| JP | A06-273171 | 9/1994 |
| JP | A06-319042 | 11/1994 |
| JP | A11-355511 | 12/1999 |
| JP | A2003-348604 | 12/2003 |
| JP | A2004-297431 | 10/2004 |

\* cited by examiner

*Primary Examiner*—Jason Whipkey
(74) *Attorney, Agent, or Firm*—Sheldon J. Moss; Chad M. Herring

(57) ABSTRACT

A shading compensation device which compensates for shading which differs for respective colors. A pixel counter counts co-ordinate positions of image data which is supplied from a black level correction section. A relative position calculation section compares the image data with compensation value tables and calculates relative co-ordinate positions of pixels which are objects of processing. A compensation value interpolation section refers to the compensation value tables, which are stored for the respective colors in a compensation value table memory, and interpolates shading compensation values for the relative co-ordinate positions calculated by the relative position calculation section. A multiplier multiplies the image data which is the objects of processing with the new shading compensation values obtained by the interpolation processing. Thus, shading-compensated image data is generated.

6 Claims, 12 Drawing Sheets

SHADING COMPENSATION DEVICE, SHADING COMPENSATION VALUE CALCULATION DEVICE AND IMAGING DEVICE

CROSS-REFERENCE TO RELATED APPLICATIONS

This application is a divisional application of U.S. Ser. No. 11/265,291 filed Nov. 3, 2005, the disclosure of which is incorporated by reference herein. This application claims priority under 35 USC 119 from Japanese Patent Application No. 2004-323820, the disclosure of which is incorporated by reference herein.

BACKGROUND OF THE INVENTION

1. Field of the Invention

The present invention relates to a shading compensation device, a shading compensation value calculation device and an imaging device, and relates to, for example, an excellent shading compensation device, shading compensation value calculation device and imaging device which are employed at a time of compensating for shading of an image signal which is outputted from a high-pixel count image capture device.

2. Description of the Related Art

In an image generated by a CCD image sensor, because of effects such as variations in transparency of a lens and the like, a so-called shading effect occurs, in which a central portion of the image is brighter than a peripheral portion. Accordingly, various techniques relating to shading compensation, in order to prevent the effects of such shading, have been disclosed.

For example, CCD camera shading compensation circuits have been disclosed (see, for example, Japanese Patent Application Laid-Open (JP-A) No. 5-83622) which are formed such that shading does not vary when the aperture of a lens is altered. The shading compensation circuit recited in JP-A No. 5-83622, in response to the size of a lens aperture, designates an address of shading compensation data which has been written to a ROM beforehand, and alters shading compensation signals in accordance with shading compensation data read from the ROM.

Further, distance detection devices for vehicles have been disclosed (see, for example, JP-A No. 6-273171) which prevent effects of shading of an imaging system and improve accuracy of detection of distances. The distance detection device for a vehicle recited in JP-A No. 6-273171 in advance has stored shading compensation data in a memory and, by multiplying the shading compensation data stored in the memory with data of respective pixels of a digital image, provides a shading-compensated digital image.

Further yet, image processing devices have been disclosed (see, for example, JP-A No. 6-319042) which are capable of shading compensation which is not influenced by noise, surface texture of a proofing plate or the like. The image processing device recited in JP-A No. 6-319042 calculates average values of brightness data for each of a plurality of regions, infers brightnesses of the pixels in the regions, calculates shading compensation values on the basis of the inferred pixel brightnesses, and utilizes these shading compensation values to correct the brightness data.

Because of increases in pixel numbers of solid-state image capture devices and reductions in cell sizes, there is a trend for shading amounts of respective colors to differ in accordance with exit pupil, aperture and the like. Hence, when shading amounts for respective colors are different, a problem arises in that colors differ between locations of a screen, and white balance is also affected. However, consideration has not been extended to differences in shading amounts for respective colors in any of the technologies recited in JP-A No. 5-83622, JP-A No. 6-273171 and JP-A No. 6-319042, and it has not been possible to solve the problems described above.

SUMMARY OF THE INVENTION

The present invention is proposed in order to solve the problems described above, and an object of the present invention is to provide a shading compensation device, shading compensation value calculation device and imaging device which are capable of compensating for shading which differs for respective colors.

A first aspect of the present invention provides a shading compensation device comprising: a compensation table storage component which stores, for each of colors, a compensation table in which shading compensation values are associated with each of a plurality of representative positions of a single screen; a relative position calculation component which, for each color, causes an image signal of the single screen and the compensation table stored in the compensation table storage component to match scale, and calculates a relative position, with respect to the representative positions of the compensation table, of a pixel of the image signal of the single screen, that is a processing object; a shading compensation value interpolation component which, for each color, interpolates a shading compensation value for the relative position calculated by the relative position calculation component on the basis of the relative position and the shading compensation values of the representative positions; and a shading compensation component which, for each color, generates a shading-compensated pixel signal based on a pixel signal of the pixel that is a processing object and the shading compensation value interpolated by the shading compensation value interpolation component.

Compensation value tables for the respective colors are stored at the compensation table storage component. The colors are not limited to three primary colors but may include other colors. The compensation value tables associate the shading compensation values with each of the plurality of representative positions of a single screen. A single screen may be a single frame, and may be a single field. With these compensation value tables, data volumes can be greatly reduced in comparison with cases featuring one shading compensation value for each pixel.

The relative position calculation component causes the image signal of the single screen to correspond with the compensation tables stored in the compensation table storage component and, for pixels which are processing objects in the image signal of the single screen, calculates relative positions with respect to the representative positions of the compensation tables. That is, the relative position calculation component calculates one relative position for each pixel of the image signal.

Now, when the compensation table is referred to, there is usually no shading compensation value that corresponds to the relative position. Accordingly, the shading compensation value interpolation component interpolates a shading compensation value for the relative position, on the basis of the relative position calculated by the relative position calculation component and the shading compensation values of the representative positions.

Then, the shading compensation component generates shading-compensated image signals, for the respective colors, on the basis of pixel signals of the pixels which are processing objects and the shading compensation values interpolated by the shading compensation value interpolation component. That is, the shading compensation component implements shading compensation for each individual pixel.

Thus, the shading compensation device relating to the present invention, by utilizing the compensation tables which associate the shading compensation values with each of the plurality of representative positions of the single screen to perform shading compensation, is capable of compensating for shading which differs for the respective colors, while greatly reducing an amount of data that must be prepared beforehand.

Herein, the shading compensation value interpolation component may utilize the shading compensation values of a predetermined number of the representative positions, which are peripheral to a relative position calculated by the relative position calculation component, for interpolating the shading compensation value for the relative position.

Further, the shading compensation device described above may further include a lens shading compensation value calculation component, which calculates lens shading compensation values on the basis of distances from a central position of the screen to the pixels that are processing objects. In such a case, the shading compensation component also utilizes the lens shading compensation values calculated by the lens shading compensation value calculation component for generating the shading-compensated pixel signals. Thus, shading caused at a lens can also be compensated for.

A second aspect of the present invention provides an imaging device comprising: an image capture component, which takes an image of a subject and generates an image signal; a storage component, which stores the image signal; a black level correction component, which corrects a black level of the image signal; a shading compensation device, which implements shading compensation of the image signal of which the black level has been corrected by the black level correction component; and a control component which performs control for, in a case of a usual exposure mode, supplying the image signal generated by the image capture component to the black level correction component, and in a case of a long-duration exposure mode, writing the image signal generated by the image capture component to the storage component and, after image capture, reading the image signal stored at the storage component and supplying the same to the black level correction component, wherein the shading compensation device includes: a compensation table storage component which stores, for each of colors, a compensation table in which shading compensation values are associated with each of a plurality of representative positions of a single screen; a relative position calculation component which, for each color, causes the image signal of the single screen and the compensation table stored in the compensation table storage component to match scale, and calculates a relative position, with respect to the representative positions of the compensation table, of a pixel of the image signal of the single screen, that is a processing object; a shading compensation value interpolation component which, for each color, interpolates a shading compensation value for the relative position calculated by the relative position calculation component on the basis of the relative position and the shading compensation values of the representative positions; and a shading compensation component which, for each color, generates a shading-compensated pixel signal based on a pixel signal of the pixel that is a processing object and the shading compensation value interpolated by the shading compensation value interpolation component.

At times of the usual exposure mode, the control component feeds the image signal generated by the image capture component to the black level correction component. Thus, in the case of the usual exposure mode, the image signals generated by the image capture component are black level-corrected, and thereafter shading-compensated.

At times of the long-duration exposure mode, the control component writes the image signals generated by the image capture component to the storage component and, after image capture, reads out the image signals stored at the storage component and feeds the same to the black level correction component. Thus, in the case of the long-duration exposure mode, the image signals generated by the image capture component are temporarily written to the storage component. Then, after the image capture, the image signals which have been read from the storage component are black level-corrected, and thereafter shading-compensated. Therefore, the black level correction component reliably detects the black level without time-variations, and performs black level correction of the image signals with high accuracy. As a result, the shading compensation device can perform shading compensation without black level floating.

Thus, even when in the long-duration exposure mode, the imaging device described above can perform shading compensation without black level floating.

A third aspect of the present invention provides a shading compensation value calculation device comprising: an image capture element, which takes an image of a subject and generates an image signal; an aggregation component which, for each of colors, aggregates color signals, which are included in the image signal generated by the image capture element, at each of a plurality of regions of a single screen, for calculating aggregate values; a white balance adjustment component which, on the basis of the aggregate values of each color calculated by the aggregation component, performs white balance adjustment for an overall region of the single screen with reference to a level of a reference color signal and a level of another color signal at a central portion of the single screen; and a shading compensation value calculation component, which calculates shading compensation values on the basis of the aggregate values of the respective regions of the single screen, which have been white balance-adjusted by the white balance adjustment component.

The aggregation component aggregates color signals, which constitute the image signal generated by the image capture device, for each color at each of the plurality of regions of the single screen, to calculate aggregate values. The plural regions referred to here correspond, respectively, to the plurality of representative positions of the compensation value tables mentioned in the above.

On the basis of the aggregate values for the respective colors which have been aggregated by the aggregation component, the white balance adjustment component implements white balance adjustment for the overall region of the single screen by reference to the level of the reference color signal and the levels of other color signals at the central portion of the single screen. Hence, although the levels of the respective color signals substantially coincide at the central portion of the screen, these levels may not coincide at end portions of the screen if shading occurs.

Accordingly, the shading compensation value calculation component calculates shading compensation values on the basis of the aggregated values of the respective regions of the single screen which have been white balance-adjusted by the white balance adjustment component.

Thus, the shading compensation value calculation component relating to the present invention, by calculating shading compensation values in order to compensate for shading at respective regions of a single screen, is capable of providing shading compensation values with a reduced amount of data.

Herein, the shading compensation value calculation component may calculate, for each of the regions of the single screen, a shading compensation value of another color signal on the basis of comparison of the aggregate value of the reference color signal with the aggregate value of the other color signal.

Furthermore, the shading compensation value calculation component may, for each of the regions of the single screen, calculate a shading compensation value of another color signal on the basis of comparison of the aggregate value of the reference color signal at the screen central portion with the aggregate value of the other color signal, and calculate a shading compensation value of the reference color signal on the basis of comparison of the aggregate value of the reference color signal at the screen central portion with the aggregate value of the reference color signal at the each region.

A fourth aspect of the present invention provides an imaging device comprising: a shading compensation device; and a shading compensation value calculation device, wherein the shading compensation device includes: a compensation table storage component which stores, for each of colors, a compensation table in which shading compensation values are associated with each of a plurality of representative positions of a single screen; a relative position calculation component which, for each color, causes an image signal of the single screen and the compensation table stored in the compensation table storage component to match scale, and calculates a relative position, with respect to the representative positions of the compensation table, of a pixel, of the image signal of the single screen, that is a processing object; a shading compensation value interpolation component which, for each color, interpolates a shading compensation value for the relative position calculated by the relative position calculation component on the basis of the relative position and the shading compensation values of the representative positions; and a shading compensation component which, for each color, generates a shading-compensated pixel signal based on a pixel signal of the pixel that is a processing object and the shading compensation value interpolated by the shading compensation value interpolation component, the shading compensation value calculation device includes: an image capture element, which takes an image of a subject and generates the image signal; an aggregation component which, for each color, aggregates color signals, which are included in the image signal generated by the image capture element, at each of a plurality of regions of the single screen, for calculating aggregate values; a white balance adjustment component which, on the basis of the aggregate values of each color calculated by the aggregation component, performs white balance adjustment for an overall region of the single screen with reference to a level of a reference color signal and a level of another color signal at a central portion of the single screen; and a shading compensation value calculation component, which calculates the shading compensation values on the basis of the aggregate values of the respective regions of the single screen, which have been white balance-adjusted by the white balance adjustment component, and the compensation table storage component stores the shading compensation values of each color which have been calculated by the shading compensation value calculation device to serve as the compensation value tables.

The shading compensation device, shading compensation value calculation device and imaging device relating to the present invention are capable of compensating for shading which is different for respective colors.

DETAILED DESCRIPTION OF THE INVENTION

Herebelow, a best mode for carrying out the present invention will be described in detail with reference to the drawings.

First Embodiment

Figure 1:
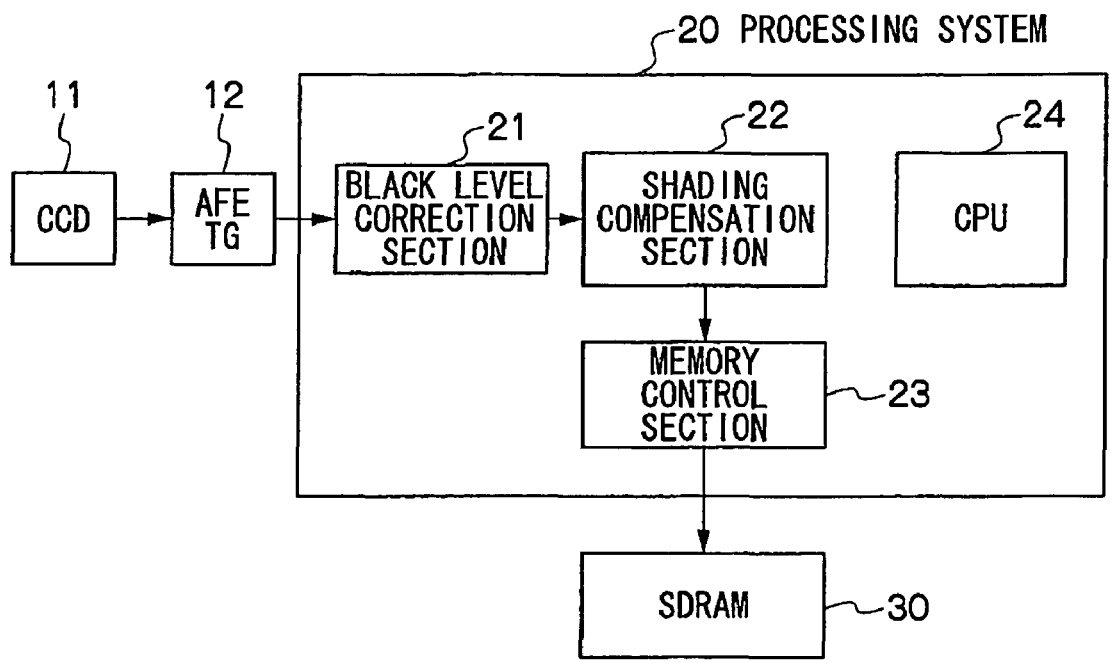
FIG. 1 is a block diagram showing structure of an imaging device relating to a first embodiment of the present invention.

FIG. 1 is a block diagram showing structure of an imaging device relating to a first embodiment of the present invention. The imaging device is provided with a CCD image sensor 11, an analog front end/timing generator (AFE/TG) 12, a processing system 20 and an SDRAM 30. The CCD image sensor 11 takes images of a subject. The AFE/TG 12 performs predetermined analog signal processing on image signals which have been generated by the CCD image sensor 11 and generates synchronous signals, the processing system 20 performs predetermined digital signal processing, and the SDRAM 30 stores image data.

The CCD image sensor 11 generates image signals constituted of three primary colors in accordance with imaged light from the subject, and feeds these image signals to the AFE/

TG 12. The AFE/TG 12 applies correlated double sampling processing and analog/digital conversion to the image signals supplied from the CCD image sensor 11. The AFE/TG 12 also generates vertically synchronized signals and horizontally synchronized signals, uses these synchronous signals during the analog signal processing, and feeds the same to the CCD image sensor 11. Then, the image data which has been converted to digital signals at the AFE/TG 12 is fed to the processing system 20.

As shown in FIG. 1, the processing system 20 is provided with a black level correction section 21, a shading compensation section 22, a memory control section 23 and a CPU 24. The black level correction section 21 corrects a black level of the image data. The shading compensation section 22 implements shading compensation of the image data. The memory control section 23 controls writing and reading of image data to and from the SDRAM 30. The CPU 24 controls overall operations of the processing system 20.

The black level correction section 21 corrects the black level of the image data fed from the AFE/TG 12 so as to eliminate an offset due to dark current noise which is included in the image data, and feeds the black level-corrected image data to the shading compensation section 22.

The shading compensation section 22 performs shading compensation of the image data, and feeds the shading-compensated image data to the memory control section 23. Herein, detailed structure of the shading compensation section 22 will be described later. Then, the memory control section 23 writes the image data which has been fed from the shading compensation section 22 to the SDRAM 30.

Figure 2:
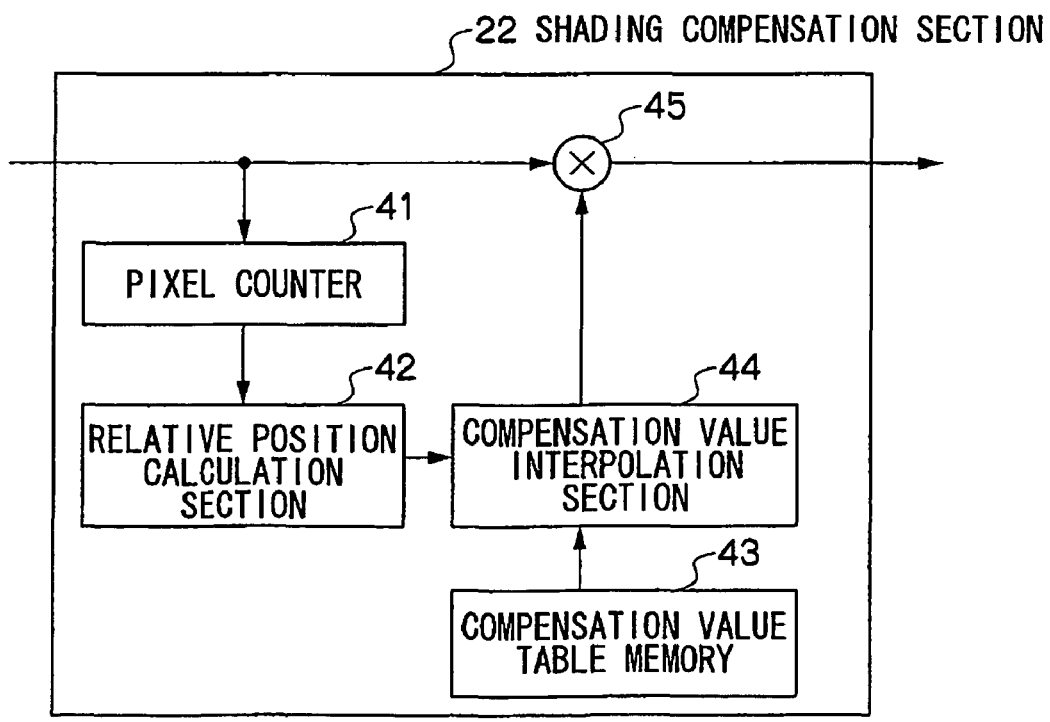
FIG. 2 is a block diagram showing structure of a shading compensation section 22.

FIG. 2 is a block diagram showing structure of the shading compensation section 22. The shading compensation section 22 implements shading correction of each pixel for each of the colors red (R), green (G) and blue (B).

The shading compensation section 22 is provided with a pixel counter 41, a relative position calculation section 42, a compensation value table memory 43, a compensation value interpolation section 44 and a multiplier 45. The pixel counter 41 counts pixels. The relative position calculation section 42 calculates relative co-ordinate positions. The compensation value table memory 43 stores compensation value tables. The compensation value interpolation section 44 interpolates to calculate shading compensation values for the relative co-ordinate positions. The multiplier 45 multiplies pixel data of pixels of the image data which are processing objects by shading compensation data.

The pixel counter 41 counts co-ordinate positions of the image data which is fed from the black level correction section 21. The relative position calculation section 42 compares the image data with the compensation value tables, and calculates relative co-ordinate positions of the pixels which are processing objects.

Compensation value tables for the respective colors R, G and B are stored at the compensation value table memory 43. The compensation value tables are tables in which, for a case in which a single screen is divided into a plurality of regions, respective shading compensation values are associated with representative positions of the respective regions. Here, in the present embodiment, the compensation value tables associate shading compensation values with co-ordinate positions of respective pixels for a case in which the single screen is divided as 8 by 8 pixels. In other words, the compensation value tables are constituted with 8 by 8 pixels.

Thus, the compensation value tables, by associating the shading compensation values with the respective regions for the case in which the single screen is divided into a mere 64 regions, can greatly reduce an amount of data in comparison with a case which features shading compensation values for individual pixels.

The compensation value interpolation section 44 refers to the compensation value tables stored in the compensation value table memory 43 for each color, and interpolates shading compensation values for the relative co-ordinate positions calculated by the relative position calculation section 42. The multiplier 45 generates the shading-compensated image data by multiplying pixel data which is the object of processing with the new shading compensation values obtained by the interpolation processing.

For, for example, image data in which the single screen is constituted by 2048 by 1536 pixels, the imaging device structured as described above performs shading compensation of a red pixel which is a processing object (the co-ordinate position (500, 1000)) as follows.

Figure 3:
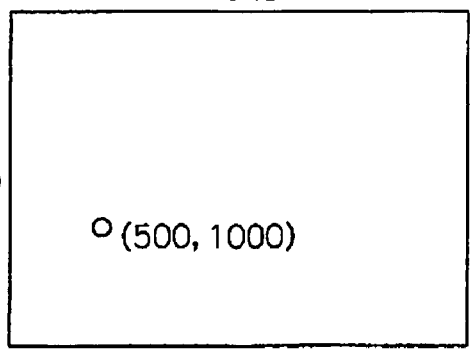
FIG. 3 is a diagram showing a co-ordinate position (500, 1000) in a single screen constituted by 2048 by 1536 pixels.

FIG. 3 is a diagram showing the co-ordinate position (500, 1000) of the single screen constituted by 2048 by 1536 pixels. The pixel counter 41 shown in FIG. 2 counts co-ordinate positions of the image data and obtains the co-ordinate position (500, 1000) of the pixel that is the processing object.

The relative position calculation section 42 calculates the relative co-ordinate position of the pixel which is the processing object with reference to numbers of vertical and horizontal pixels of the compensation value tables. That is, the relative position calculation section 42 calculates a relative co-ordinate position of the pixel which is the processing object, corresponding to a case in which the vertical and horizontal numbers of pixels of the image data of the single screen are shrunk so as to match with the vertical and horizontal numbers of pixels of a compensation value table.

Figure 4:
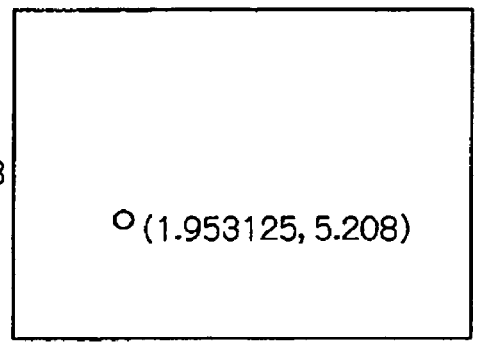
FIG. 4 is a diagram showing image data of the single screen which has been compressed so as to correspond with a compensation value table.

FIG. 4 is a diagram showing image data of the single screen which has been shrunk so as to correspond with the compensation value table. With horizontal compression of $1/256$ and vertical compression of $1/192$, the relative co-ordinate position of the co-ordinate position (500, 1000) in the 2048×1536-pixel single screen becomes (1.953125, 5.208). That is, the relative position calculation section 42 calculates the relative co-ordinate position (1.953125, 5.208).

The compensation value interpolation section 44 refers to the compensation value table stored in the compensation value table memory 43, and calculates a shading compensation value corresponding to the relative co-ordinate position by interpolation.

Figure 5:
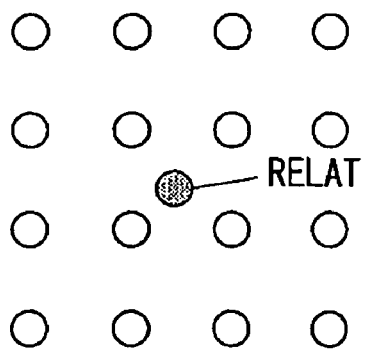
FIG. 5 is a diagram for explaining an interpolation calculation of a shading compensation value corresponding to a relative co-ordinate position.

FIG. 5 is a diagram for explaining the interpolation calculation of the shading compensation value corresponding to the relative co-ordinate position. The compensation value interpolation section 44 utilizes, for example, a spline function, which is a function without discontinuities, and sixteen shading compensation values peripheral to the relative co-ordinate position to interpolate the shading compensation value corresponding to the relative co-ordinate position.

If the relative co-ordinate position is at an edge of the compensation value table, it may not be possible to acquire the sixteen shading compensation values. In such a case, the compensation value interpolation section 44 may extrapolate shading compensation values which are at the edge of the compensation value table unaltered, and thus acquire sixteen shading compensation values peripheral to the relative co-ordinate position. Further, the interpolation calculation of the shading compensation value corresponding to the relative co-ordinate position is not limited to the calculation described above.

The multiplier 45 generates shading-compensated red pixel data by multiplying the image data of the aforementioned co-ordinate position (500, 1000) which is the processing object with the shading compensation value calculated by interpolation at the compensation value interpolation section 44.

Similarly, the shading compensation is applied to all red pixels, and then the shading compensation is applied in a similar manner to all the blue and green pixels. Hence, the shading-compensated image data is stored to the SDRAM 30 via the memory control section 23.

As described above, the imaging device relating to the first embodiment of the present invention includes compensation value tables for each color in which respective shading compensation values are associated with representative positions of plural regions of a single screen. Thus, in comparison with a case of including shading compensation values corresponding to all pixels, a data volume that must be held can be hugely reduced.

Further, this imaging device can implement a shading compensation that would be difficult to express as a function simply, by referring to the compensation value tables and interpolating the shading compensation values for the co-ordinate positions that are processing objects.

Note that although this imaging device compresses the image data so as to fit to the compensation value table, it is also possible to expand the compensation value table to fit to the image data.

Figure 6:
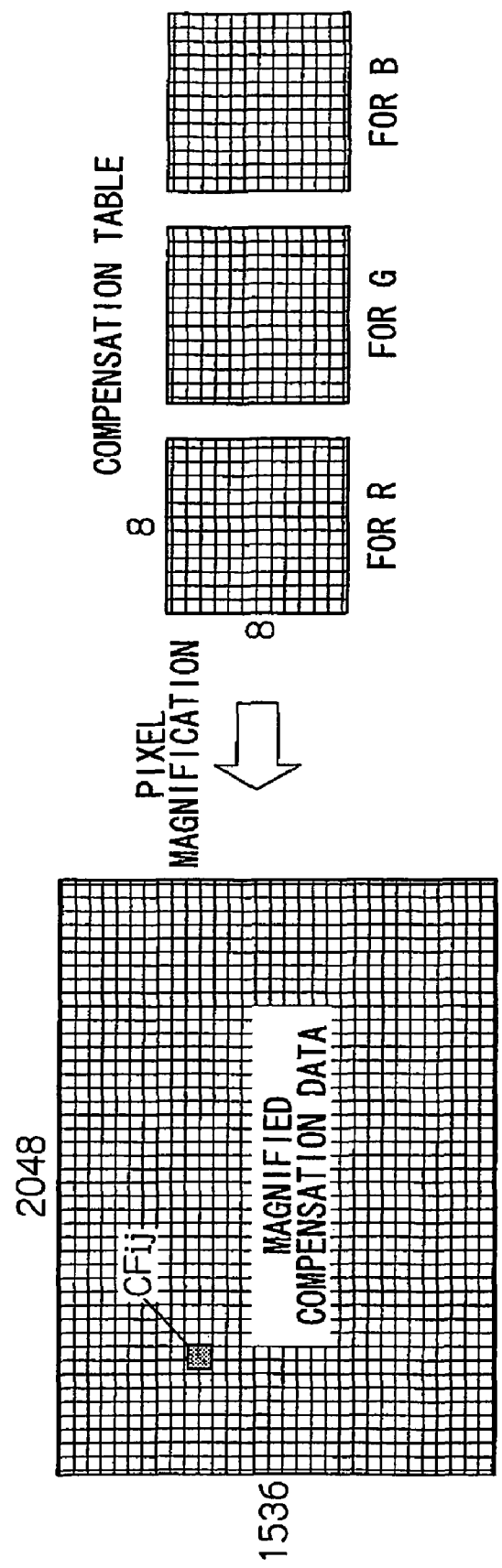
FIG. 6 is a diagram showing a state in which 8×8-pixel compensation value tables are magnified so as to correspond with 2048×1536-pixel image data.

FIG. 6 is a diagram showing a state in which 8×8-pixel compensation value tables are magnified so as to correspond with 2048×1536-pixel image data. In such a case, the co-ordinate positions of the respective pixels of the compensation value tables are also magnified. Hence, magnified compensation data $CF_{ij}$ of a co-ordinate position (i,j) in the 2048 by 1536 pixels is calculated by interpolation of the shading compensation values of the magnified compensation value tables.

Figure 7:
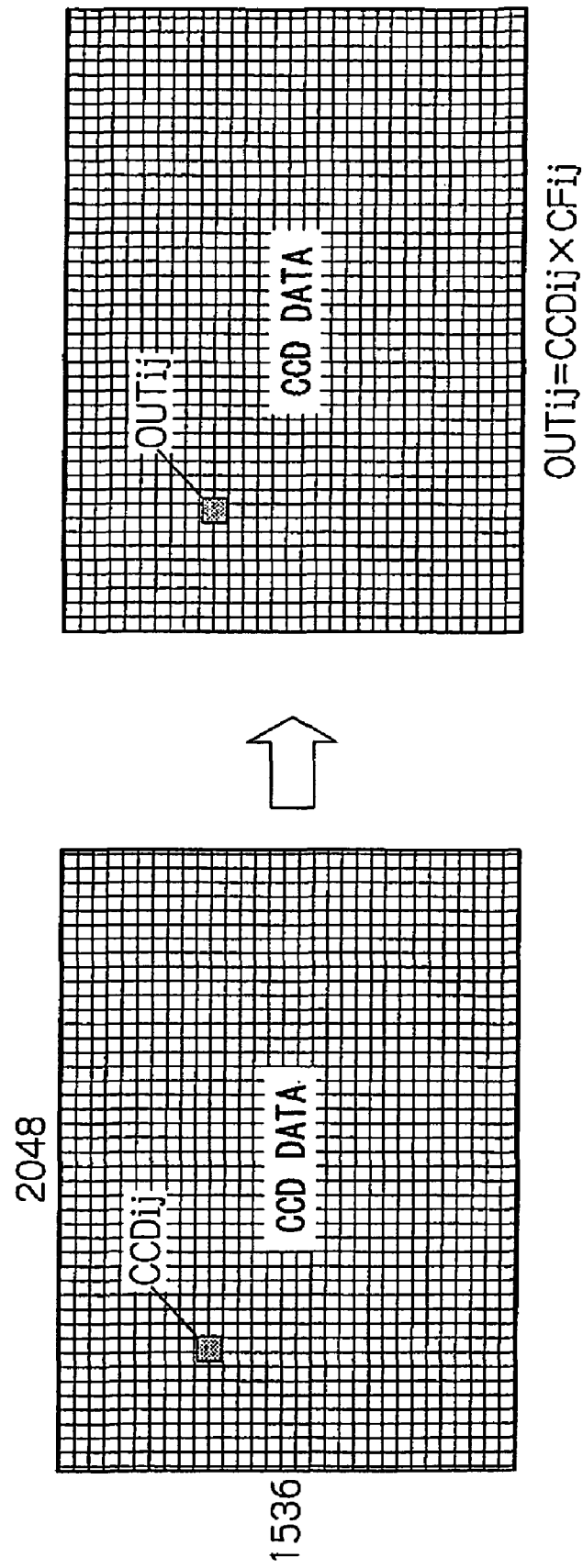
FIG. 7 is a diagram showing CCDij and OUTij.

FIG. 7 is a diagram showing $CCD_{ij}$ and $OUT_{ij}$. If image data (CCD data) that is a processing object is '$CCD_{ij}$' and the CCD data after compensation is '$OUT_{ij}$', $OUT_{ij}$ is found by the following equation.

$$OUT_{ij} = CCD_{ij} \times CF_{ij}$$

As described above, this imaging device may magnify the compensation value tables to correspond with the image data. Hence, utilizing the shading compensation values of the magnified compensation value tables, interpolation calculations of the shading compensation values for the pixels that are processing objects are implemented, and shading compensation of the pixel data of the pixels that are processing objects can be implemented in accordance with these shading compensation values.

Second Embodiment

Next, a second embodiment of the present invention will be described. Here, portions that are the same as in the first embodiment are assigned the same reference numerals, and detailed descriptions thereof are omitted.

Figure 8:
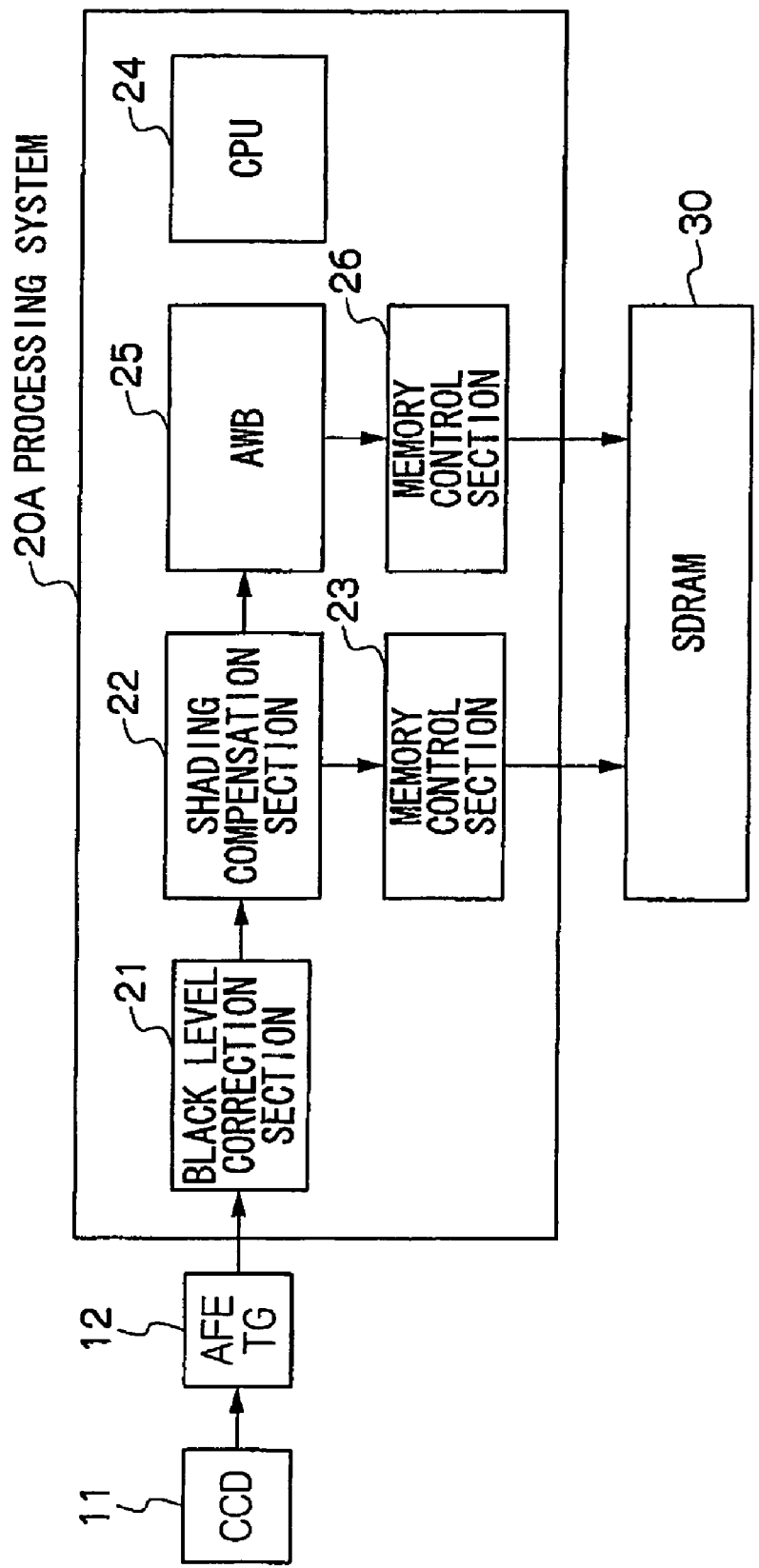
FIG. 8 is a block diagram showing structure of an imaging device relating to a second embodiment of the present invention.

FIG. 8 is a block diagram showing structure of an imaging device relating to the second embodiment. The imaging device relating to the second embodiments calculates red and blue shading compensation values, and is provided with a processing system 20A with a structure which differs from the first embodiment.

In addition to the various structures of the processing system 20 shown in FIG. 1, the processing system 20A is further provided with an auto white balance (AWB) adjustment section 25 and a memory control section 26. The AWB adjustment section 25 both implements automatic white balance adjustment and calculates shading compensation values. The memory control section 26 writes image data to the SDRAM 30 after the white balance adjustment.

The imaging device which is structured as described above calculates shading compensation values in accordance with the following procedure when imaging a gray proofing plate.

Figure 9:
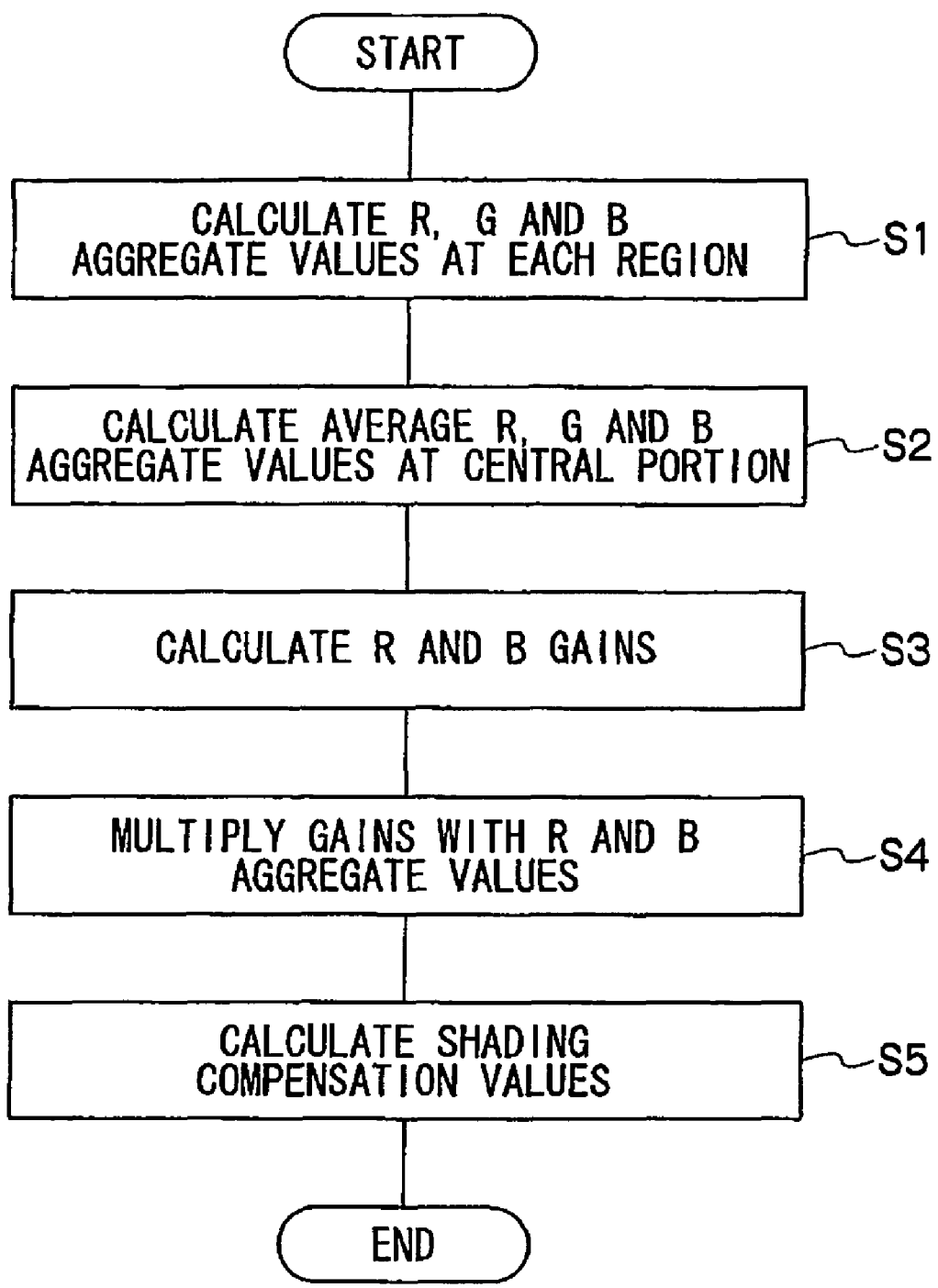
FIG. 9 is a flowchart showing a shading correction value generation routine.

FIG. 9 is a flowchart showing a shading correction value generation routine. The AWB adjustment section 25 of the imaging device executes the following shading correction value generation routine in accordance with image data supplied via the black level correction section 21 and the shading compensation section 22. Herein, when this routine is executed, the shading compensation section 22 simply throughputs the image data supplied thereto from the black level correction section 21 without performing shading compensation.

In step S1, the AWB adjustment section 25 divides image data constituted of for example, 2048 by 1536 pixels of three basic colors into 8 by 8 regions, calculates aggregate values of the colors $R_{ji}$, $G_{ji}$ and $B_{ji}$ for each region, and then proceeds to step S2.

Figures 10A, 10B:
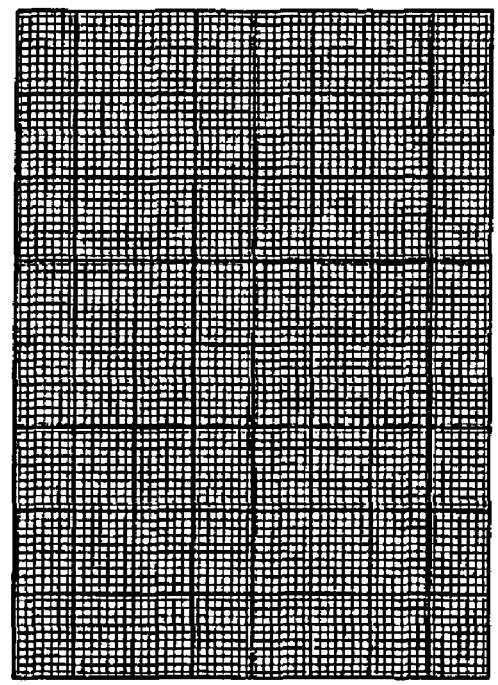
FIG. 10A is a diagram describing image data which is composed of 2048 by 1536 pixels of three primary colors.
FIG. 10B is a diagram describing aggregate values (summed values Rji) of R data for respective regions, in a case in which the image data is divided into 8 by 8 regions.

FIG. 10A is a diagram describing 2048 by 1536 pixels of R data, and FIG. 10B is a diagram describing aggregate values (summed values $R_{ji}$) of R data for respective regions, when the image data has been divided into 8 by 8 regions. In such a case, the summed values $R_{ji}$ are obtained by summing values of 256 by 192 pixels of R data for each region. Here, in FIG. 10B, $R_{00}$ represents a top-left region or an aggregate value thereof. With $R_{00}$ as an origin, the regions $R_{ji}$ are represented as $R_{01}$, $R_{02}$, ..., $R_{07}$ moving toward the right, and are represented as $R_{10}$, $R_{20}$, ..., $R_{70}$ moving toward the bottom. The AWB adjustment section 25 also calculates summed values $G_{ji}$ and $B_{ji}$ for the respective regions in a similar manner.

In step S2, the AWB adjustment section 25 calculates averages of the aggregate values of predetermined regions which are at a central portion of the screen, for each of R, G and B. The AWB adjustment section 25 calculates an average value Rcenter of, for example, the summed values $R_{33}$, $R_{34}$, $R_{43}$ and $R_{44}$ of four regions at the central portion of the screen. Similarly for G and B, the AWB adjustment section 25 calculates average values of the aggregate values of the four regions at the screen central portion. That is, the AWB adjustment section 25 performs the following calculations, and then proceeds to step S3.

$$R\text{center} = (R_{33} + R_{34} + R_{43} + R_{44})/4$$

$$G\text{center} = (G_{33} + G_{34} + G_{43} + G_{44})/4$$

$$B\text{center} = (B_{33} + B_{34} + B_{43} + B_{44})/4$$

In step S3, the AWB adjustment section 25 calculates respective gains of R and B, Rgain and Bgain. That is, the AWB adjustment section 25 performs the following calculations, and then proceeds to step S4.

$$R\text{gain} = G\text{center}/R\text{center}$$

$$B\text{gain} = G\text{center}/B\text{center}$$

In step S4, the AWB adjustment section 25 multiplies the respective gains Rgain and Bgain with the summed values $R_{ji}$ and $B_{ji}$ to calculate $R'_{ji}$ and $B'_{ji}$. That is, the AWB adjustment section 25 performs the following calculations, and then proceeds to step S5.

$$R'_{ji} = R\text{gain} \times R_{ji}$$

$$B'_{ji} = B\text{gain} \times B_{ji}$$

Figures 11, 12:
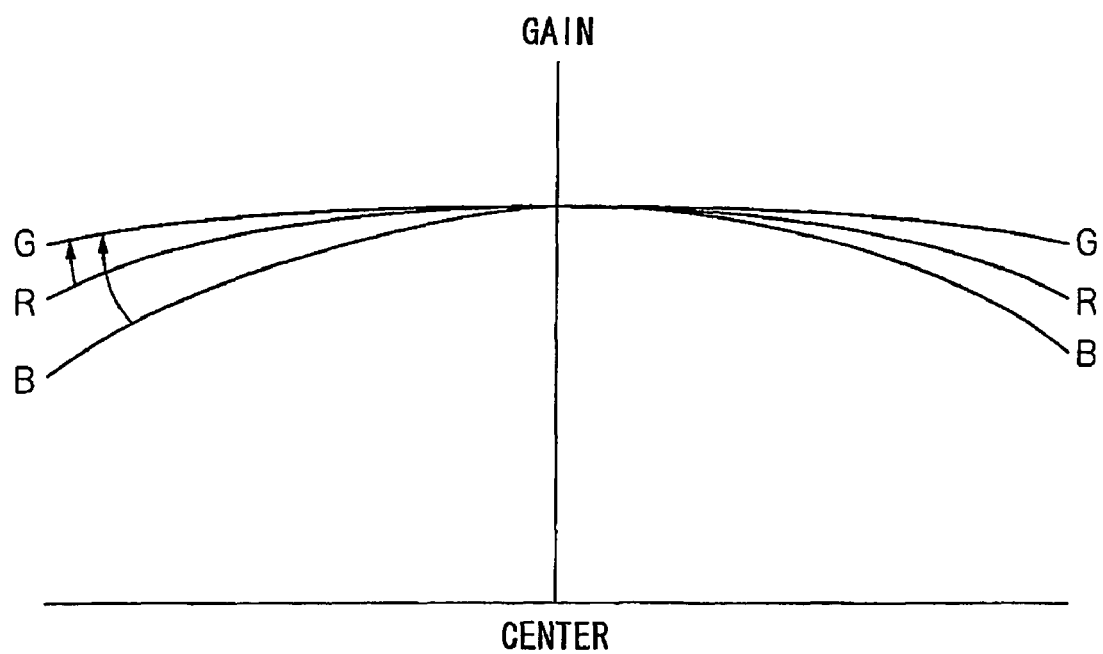
FIG. 11 is a diagram showing R'ji for respective regions in the case in which the image data is divided into 8 by 8 regions.
FIG. 12 is a diagram showing levels of R, G and B data after white balance adjustment.

FIG. 11 is a diagram showing R'ji for respective regions in the case in which the image data is divided into 8 by 8 regions. Thus, by performing the processing from step S1 to step S4, the AWB adjustment section 25 performs white balance adjustment to adjust the R data and the B data of the whole screen by reference to the average values of the R, G and B data at the central portion of the image. As a result, the summed values R'ji and B'ji are provided for each of the eight by eight regions subsequent to white balance adjustment with the central portion of the image being the reference point.

FIG. 12 is a diagram showing R, G and B data after the white balance adjustment. Because the white balance adjustment is performed with reference to the central portion of the image, levels of the R, G and B data at the central portion of the image substantially coincide. However, compared with the G data, the levels of the R and B data fall from the central portion toward the edges of the image. When there are such mismatches of the respective levels of the data, shading will occur in accordance with these mismatches.

Accordingly, in step S5, the AWB adjustment section 25 performs the following calculations to find shading compensation values RHji and BHji.

$$RHji = Gji/R'ji$$

$$BHji = Gji/B'ji$$

That is, in consideration of occurrences of shading in accordance with mismatches of the levels of the white balance-adjusted R, G and B data, after the white balance adjustment, the AWB adjustment section 25 finds the mismatches of the summed values R'ji and B'ji with respect to the summed values Gji, in the form of the shading compensation values RHji and BHji. Herein, in order to prevent over-compensation, the values RHji and BHji mentioned above may be multiplied by, for example, a predetermined coefficient $\alpha$ (<1). Preferable values of $\alpha$ are, for example, 0.9, 0.8 and the like.

Figures 13, 14:
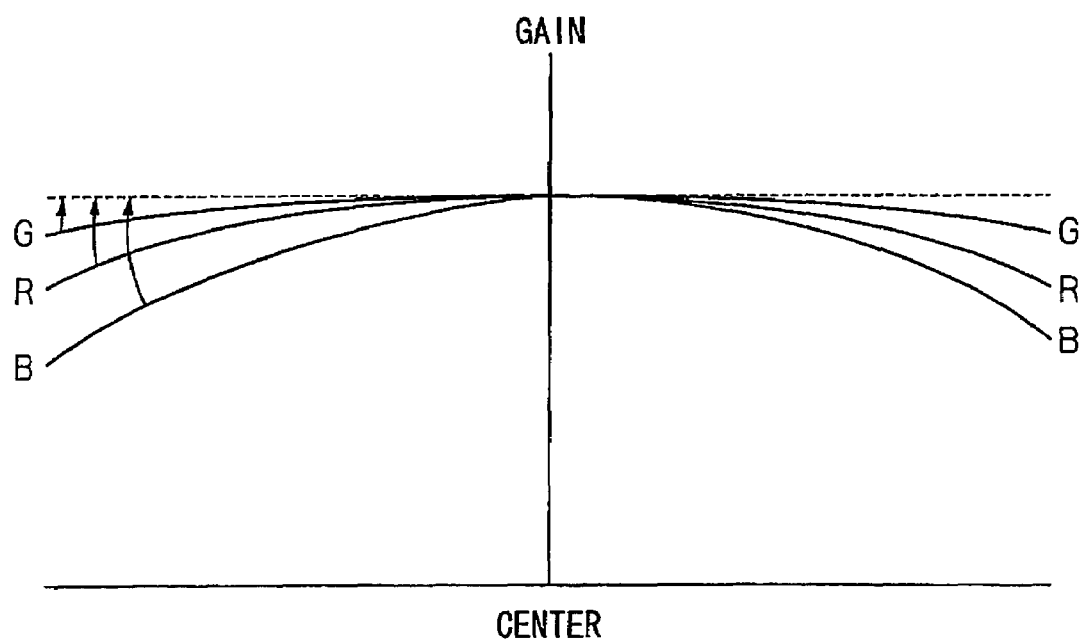
FIG. 13 is a diagram showing R'ji for respective regions in the case in which the image data is divided into 8 by 8 regions.
FIG. 14 is a diagram showing levels of R, G and B data after white balance adjustment.

FIG. 13 is a diagram showing RHji for respective regions in the case in which the image data is divided into 8 by 8 regions. This corresponds to a compensation value table for R. A compensation value table for B is found by the AWB adjustment section 25 in a similar manner.

As described above, the imaging device relating to the second embodiment can obtain compensation value tables for R and B by finding offsets of the summed values R'ji and B'ji relative to the summed values Gji after the white balance adjustment, to serve as shading compensation values.

Third Embodiment

Next, a third embodiment of the present invention will be described. Here, portions that are the same as in the second embodiment are assigned the same reference numerals, and detailed descriptions thereof are omitted.

The imaging device relating to the third embodiment calculates, as well as shading compensation values for R and B, shading compensation values for G Here, the imaging device relating to the present embodiment has a similar structure to the second embodiment, but a portion of the shading compensation value generation routine of the AWB adjustment section 25 is different.

Specifically, after performing the processing from step S1 to step S4 shown in FIG. 9, the AWB adjustment section 25 may perform the following calculations, so as to find shading compensation values RHji, GHji and BHji.

$$RHji = Gcenter/R'ji$$

$$GHji = Gcenter/Gji$$

$$BHji = Gcenter/B'ji$$

FIG. 14 is a diagram showing levels of R, G and B data after white balance adjustment. Although not to the same extent as the R and B data, the level of the G data falls slightly from the central portion toward the edges of the image. Accordingly, after the white balance adjustment, the AWB adjustment section 25 finds the mismatches of the summed values R'ji, Gji and B'ji with respect to Gcenter of the central portion of the summed values Gji, in the form of the shading compensation values RHji, GHji and BHji. Thus, compensation value tables are found for R, G and B.

Here, in order to prevent over-compensation, the values RHji, GHji and BHji described above may be multiplied by, for example, a predetermined coefficient $\alpha$ (<1). Preferable values of $\alpha$ are, for example, 0.9, 0.8 and the like.

As described above, the imaging device relating to the third embodiment can, by finding offsets of the summed values of R'ji, Gji and B'ji relative to Gcenter of the central portion of the summed values Gji after the white balance adjustment to serve as shading compensation values, obtain compensation value tables which enable more accurate compensation than in the second embodiment.

Fourth Embodiment

Next, a fourth embodiment of the present invention will be described. Here, portions that are the same as in the embodiments described above are assigned the same reference numerals, and detailed descriptions thereof are omitted.

The imaging device relating to the fourth embodiment is also capable of compensating for lens shading. Hereafter, the shading compensation values utilized in the first to third embodiments are referred to as "CCD shading compensation values", and the compensation values for lens shading are referred to as "lens shading compensation values".

Instead of the shading compensation section 22 illustrated for the embodiments described above, the imaging device relating to the present embodiment is provided with the shading compensation section 22A as follows.

Figure 15:
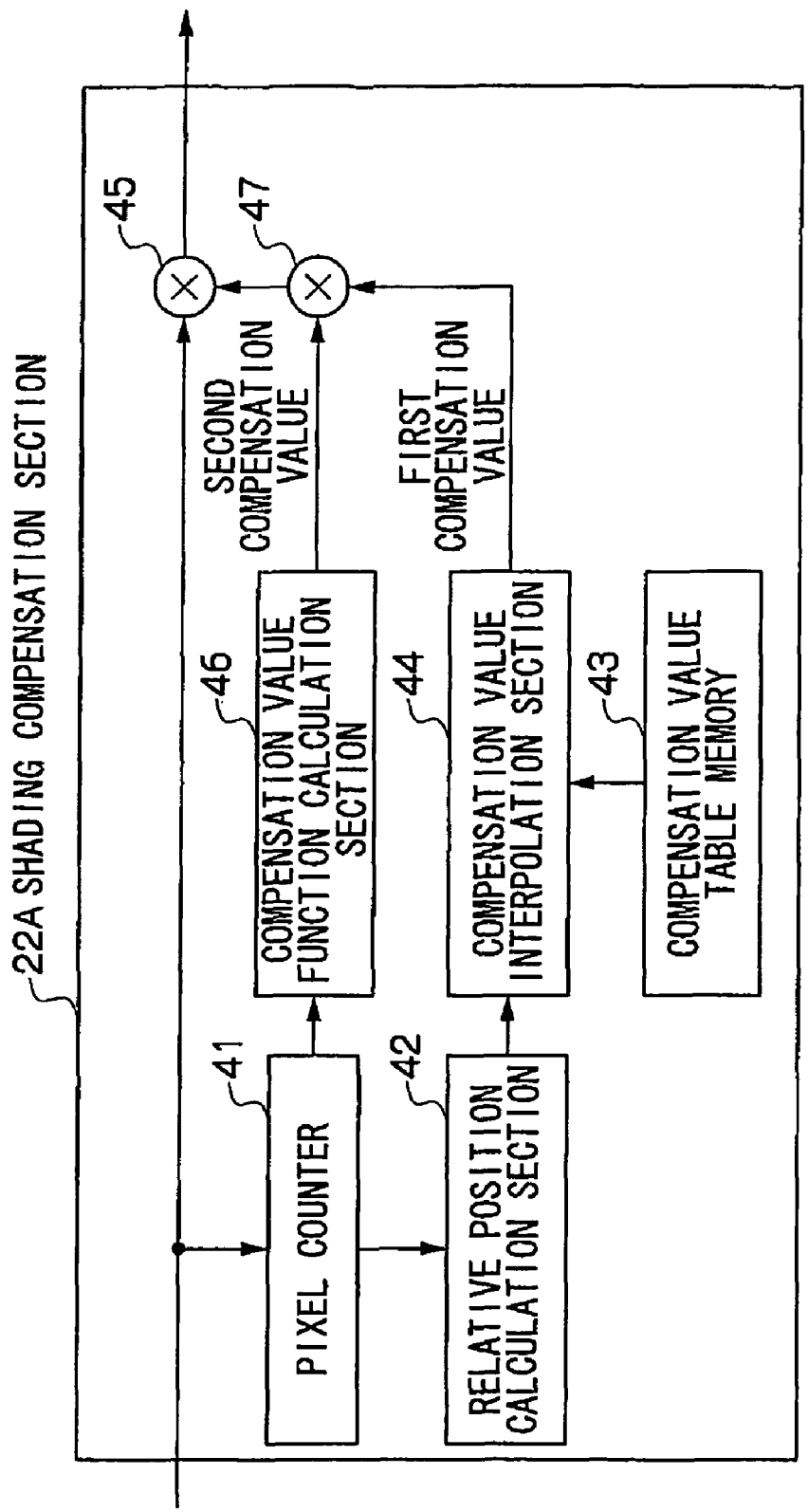
FIG. 15 is a block diagram showing structure of a shading compensation section 22A.

FIG. 15 is a block diagram showing structure of the shading compensation section shading compensation section 22A. In addition to the structure shown in FIG. 2, the shading compensation section 22A is provided with a compensation value function calculation section 46 and a multiplier 47. The compensation value function calculation section 46 utilizes a lens shading compensation function to calculate lens shading compensation values. The multiplier 47 multiplies the CCD shading compensation values with the lens shading compensation values.

Figure 16:
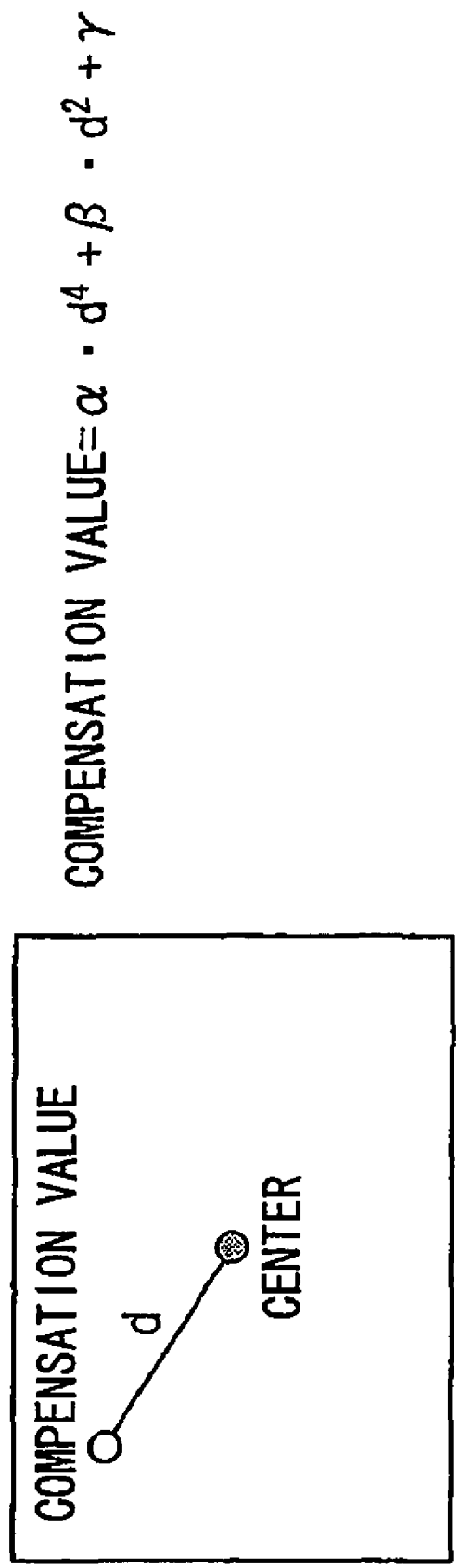
FIG. 16 is a diagram for explaining a lens shading compensation function.

FIG. 16 is a diagram for explaining the lens shading compensation function. In the lens shading compensation function, a distance d from a center serves as a variable, and the function is represented by, for example, the following equation.

$$\text{Lens shading compensation value} = \alpha \cdot d^4 + \beta \cdot d^2 + \gamma$$

The compensation value function calculation section 46 calculates the distance d from a center position to a co-ordinate position which has been counted by the pixel counter 41, and calculates a lens shading compensation value by substitution of the distance d into the above equation.

The multiplier 47 multiplies a CCD shading compensation value found by the compensation value interpolation section 44 with a lens shading compensation value found by the compensation value function calculation section 46, and feeds the multiplied value to the multiplier 45. Then, the multiplier 45 multiplies image data which is a processing object by the new shading compensation value found by the multiplier 47. Thus, shading-compensated image data is generated.

As described above, the imaging device relating to the fourth embodiment can simultaneously compensate not just for shading caused at the CCD image sensor 11, but also for shading caused at a lens.

Fifth Embodiment

Next, a fifth embodiment of the present invention will be described. Here, portions that are the same as in the embodiments described above are assigned the same reference numerals, and detailed descriptions thereof are omitted.

Figure 17:
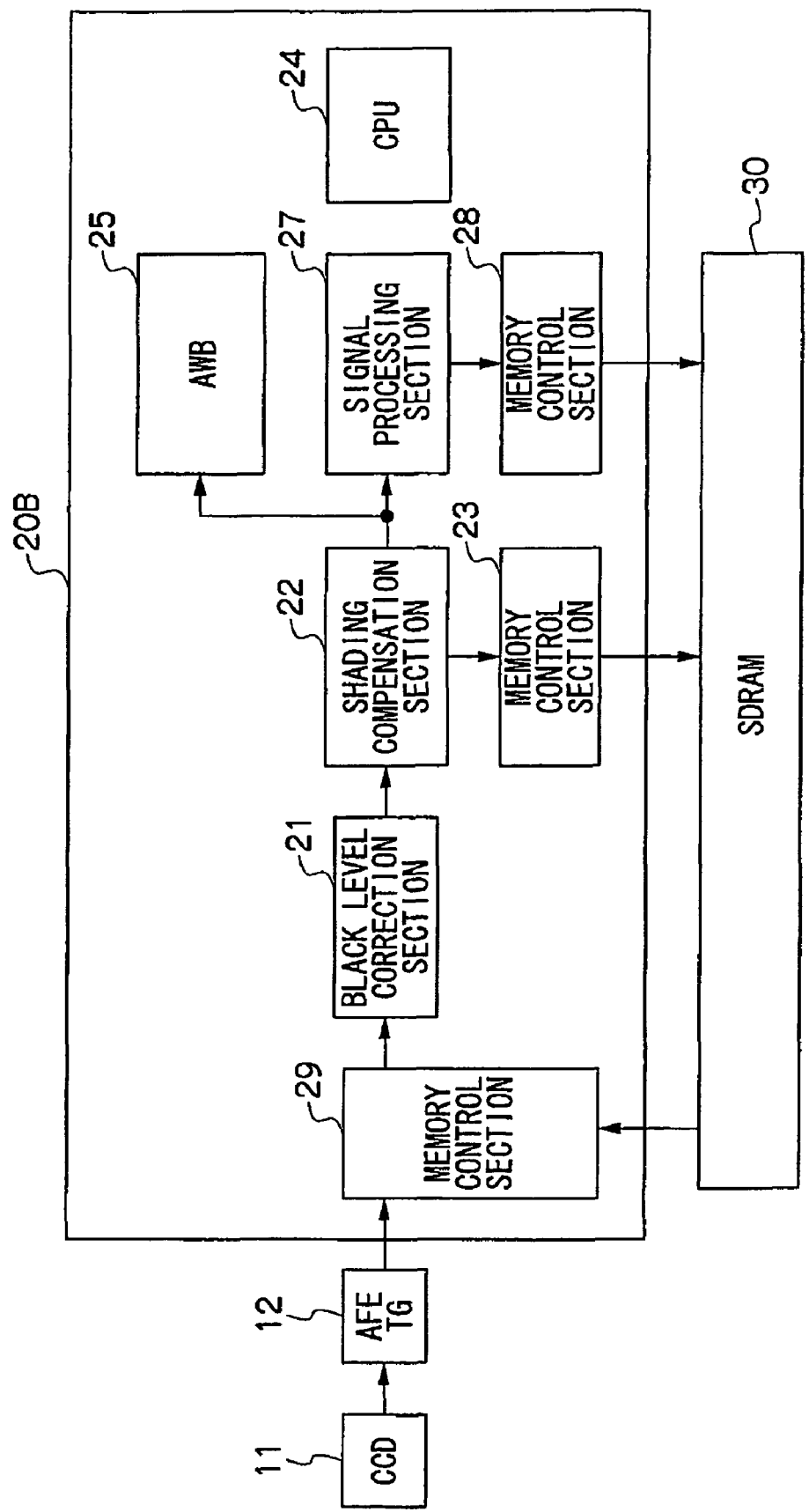
FIG. 17 is a block diagram showing structure of an imaging device relating to a fifth embodiment of the present invention.

FIG. 17 is a block diagram showing structure of an imaging device relating to the fifth embodiment. The imaging device relating to the fifth embodiment is capable of executing shading compensation properly even with a long-duration exposure at a time of image capture, and is provided with a processing system 20B instead of the processing system 20 or processing system 20A of the embodiments described above.

In addition to the black level correction section 21, the shading compensation section 22, the memory control section 23, the CPU 24 and the AWB adjustment section 25, the processing system 20B is provided with a signal processing section 27, a memory control section 28 and a memory control section 29. The signal processing section 27 carries out predetermined digital signal processing on the shading-compensated image data. The memory control section 28 writes the white balance-adjusted or digital signal-processed image data to the SDRAM 30. The memory control section 29 reads the image data from the SDRAM 30 and feeds the same to the black level correction section 21. Herein, the black level correction section 21 and the shading compensation section 22 perform predetermined compensation processing at a time of reading of image data or at a time of signal processing.

Times of Usual Exposure

The imaging device structured as described above operates as follows for cases of image capture by usual exposure.

At the time of image capture, the memory control section 29 feeds the image data supplied from the AFE/TG 12 to the black level correction section 21. This image data is black level-corrected by the black level correction section 21, and shading-compensated by the shading compensation section 22. Then, the shading compensation section 22 writes the shading-compensated image data to the SDRAM 30, via the memory control section 23, and stores the same at the AWB adjustment section 25 to serve as aggregate data for white balance adjustment.

At the time of signal processing, the memory control section 29 reads the shading-compensated image data from the SDRAM 30 and the aggregate data for white balance adjustment. The data which has been read by the memory control section 29 is provided through the black level correction section 21 and the shading compensation section 22, and fed to the signal processing section 27. The signal processing section 27 utilizes the aggregate data for white balance adjustment to perform white balance adjustment, and other digital signal processing, on the image data. Thereafter, the processed image data is written to the SDRAM 30 via the memory control section 28.

Thus, this imaging device saves the black level-corrected and shading-compensated image data to serve as the aggregate data for white balance adjustment at the time of image capture, and utilizes the aggregate data for white balance adjustment to perform the white balance adjustment at the time of signal processing. Thus, accuracy of the signal processing is raised.

Now, if processing as described above is performed in a case of image capture with a long-duration exposure, the black level will gradually float during the exposure duration, it will not be possible to correct the black level consistently, and there may be black-floating in the image data. Furthermore, if the shading compensation is performed on image data with black-floating, there may be a problem in that the black level also floats in accordance with the compensation amounts.

Times of Long-Duration Exposure

Accordingly, this imaging device performs processing as follows in a case of image capture with a long-duration exposure.

The memory control section 29 writes the unprocessed image data supplied from the AFE/TG 12 to the SDRAM 30. Meanwhile, the unprocessed image data is provided through the black level correction section 21 and the shading compensation section 22, and fed to the AWB adjustment section 25. Hence, at the AWB adjustment section 25, the unprocessed image data is stored to serve as the aggregate data for white balance adjustment.

At the time of signal processing, the memory control section 29 reads the image data from the SDRAM 30 and the aggregate data for white balance adjustment. This image data is black level-corrected by the black level correction section 21 and shading-compensated by the shading compensation section 22, and then fed to the signal processing section 27. As a result, the black level correction section 21 can detect an accurate black level on the basis of the unprocessed image data which has been temporarily held at the SDRAM 30, and can correct the black level with high accuracy. Then, the signal processing section 27 utilizes the aggregate data for white balance adjustment, which has been stored at the AWB adjustment section 25, to execute the white balance adjustment, and other predetermined processing, on the shading-compensated image data. The memory control section 28 writes the image data that has been processed by the signal processing section 27 to the SDRAM 30.

As described above, the imaging device relating to the fifth embodiment performs black level correction and shading compensation on image data from the image capture system at a time of image capture with usual exposure, but at a time of image capture with a long-duration exposure, temporarily stores the image data from the image capture system and performs the black level correction and shading compensation on the image data subsequent to the image capture.

Thus, this imaging device can, at a time of image capture with a long-duration exposure, perform the black level correction and the shading compensation on image data in which a floating amount of black is settled. Therefore, this imaging device can perform excellent black level correction and shading compensation even on image data of a long-duration exposure.

Note that the present invention is not limited to the embodiments described above, and variations of design are possible within the scope recited in the patented claims. For example, details of the respective embodiments may be arbitrarily combined.

What is claimed is:

1. A shading compensation value calculation device comprising:
    an image capture element, which takes an image of a subject and generates an image signal;

an aggregation component which, for each of colors, aggregates color signals, which are included in the image signal generated by the image capture element, at each of a plurality of regions of a single screen, for calculating aggregate values;

a white balance adjustment component which, on the basis of the aggregate values of each color calculated by the aggregation component, performs white balance adjustment for an overall region of the single screen with reference to a level of a reference color signal and a level of another color signal at a central portion of the single screen; and a shading compensation value calculation component, which calculates shading compensation values on the basis of the aggregate values of the respective regions of the single screen, which have been white balance-adjusted by the white balance adjustment component.

2. The shading compensation value calculation device of claim 1, wherein the shading compensation value calculation component calculates, for each of the regions of the single screen, a shading compensation value of the other color signal on the basis of comparison of the aggregate value of the reference color signal with the aggregate value of the other color signal.

3. The shading compensation value calculation device of claim 1, wherein the shading compensation value calculation component, for each of the regions of the single screen, calculates a shading compensation value of the other color signal on the basis of comparison of the aggregate value of the reference color signal at the screen central portion with the aggregate value of the other color signal, and calculates a shading compensation value of the reference color signal on the basis of comparison of the aggregate value of the reference color signal at the screen central portion with the aggregate value of the reference color signal at the each region.

4. An imaging device comprising:
a shading compensation device; and
a shading compensation value calculation device,
wherein the shading compensation device includes:
a compensation table storage component which stores, for each of colors, a compensation table in which shading compensation values are associated with each of a plurality of representative positions of a single screen;
a relative position calculation component which, for each color, causes an image signal of the single screen and the compensation table stored in the compensation table storage component to match scale, and calculates a relative position, with respect to the representative positions of the compensation table, of a pixel, of the image signal of the single screen, that is a processing object;
a shading compensation value interpolation component which, for each color, interpolates a shading compensation value for the relative position calculated by the relative position calculation component on the basis of the relative position and the shading compensation values of the representative positions; and
a shading compensation component which, for each color, generates a shading-compensated pixel signal based on a pixel signal of the pixel that is a processing object and the shading compensation value interpolated by the shading compensation value interpolation component, the shading compensation value calculation device includes:
an image capture element, which takes an image of a subject and generates the image signal;
an aggregation component which, for each color, aggregates color signals, which are included in the image signal generated by the image capture element, at each of a plurality of regions of the single screen, for calculating aggregate values;
a white balance adjustment component which, on the basis of the aggregate values of each color calculated by the aggregation component, performs white balance adjustment for an overall region of the single screen with reference to a level of a reference color signal and a level of another color signal at a central portion of the single screen; and
a shading compensation value calculation component, which calculates the shading compensation values on the basis of the aggregate values of the respective regions of the single screen, which have been white balance-adjusted by the white balance adjustment component,
and the compensation table storage component stores the shading compensation values of each color which have been calculated by the shading compensation value calculation device to serve as the compensation value tables.

5. The imaging device of claim 4, wherein the shading compensation value interpolation component utilizes the shading compensation values of a predetermined plurality of the representative positions, which is peripheral to the relative position calculated by the relative position calculation component, for interpolating the shading compensation value for the relative position.

6. The imaging device of claim 4, wherein the shading compensation device further comprises a lens shading compensation value calculation component, which calculates a lens shading compensation value on the basis of a distance from a central position of the screen to the pixel that is a processing object,
and the shading compensation component utilizes the lens shading compensation value calculated by the lens shading compensation value calculation component for generating the shading-compensated pixel signal.

* * * * *